US008275377B2

(12) United States Patent  (10) Patent No.: US 8,275,377 B2
Nanda et al.  (45) Date of Patent: Sep. 25, 2012

(54) WIRELESS HANDOFFS BETWEEN MULTIPLE NETWORKS

(75) Inventors: Sanjiv Nanda, Ramona, CA (US);
Arnaud Meylan, San Diego, CA (US);
Manoj M. Deshpande, San Diego, CA (US); Ranjith Jayaram, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 543 days.

(21) Appl. No.: 11/539,059

(22) Filed: Oct. 5, 2006

(65) Prior Publication Data

US 2007/0249291 A1  Oct. 25, 2007

Related U.S. Application Data

(60) Provisional application No. 60/794,042, filed on Apr. 20, 2006.

(51) Int. Cl.
*H04W 36/00* (2009.01)
*H04W 72/00* (2009.01)
*H04W 4/00* (2009.01)
*H04B 7/00* (2006.01)
*G06F 15/173* (2006.01)

(52) U.S. Cl. ......... 455/436; 455/73; 455/450; 455/525; 455/452.2; 370/401; 370/331; 370/338; 709/223

(58) Field of Classification Search .................. 455/436, 455/73
See application file for complete search history.

(56) References Cited

U.S. PATENT DOCUMENTS

| 7,292,592 | B2 * | 11/2007 | Rune ........................ 370/401 |
| 2003/0040311 | A1 | 2/2003 | Choi |
| 2003/0203735 | A1 * | 10/2003 | Andrus et al. ............ 455/450 |
| 2004/0008645 | A1 | 1/2004 | Janevski et al. |
| 2004/0157608 | A1 * | 8/2004 | Kurose et al. ............ 455/436 |
| 2004/0198220 | A1 * | 10/2004 | Whelan et al. ........... 455/41.1 |
| 2004/0218575 | A1 * | 11/2004 | Ibe et al. .................. 370/338 |
| 2005/0037787 | A1 | 2/2005 | Bachner, III. |
| 2005/0255847 | A1 * | 11/2005 | Han et al. ................. 455/436 |
| 2006/0025148 | A1 * | 2/2006 | Karaoguz et al. ......... 455/452.2 |
| 2006/0084439 | A1 * | 4/2006 | Joshi et al. ............... 455/436 |
| 2006/0200543 | A1 * | 9/2006 | Kong et al. ............... 709/223 |
| 2006/0291419 | A1 * | 12/2006 | McConnell et al. ...... 370/331 |
| 2007/0049323 | A1 * | 3/2007 | Wang et al. .............. 455/525 |

(Continued)

FOREIGN PATENT DOCUMENTS

FR  2 774 842  8/1999

(Continued)

OTHER PUBLICATIONS

"Universal Mobile Telecommunications System (UMTS)," ETSI Standards, European Telecommunications Standards Institute, Sophia-Antipo, FR, vol. 3-R2, No. V690, Mar. 2006.

(Continued)

*Primary Examiner* — Wayne Cai
*Assistant Examiner* — Timothy Pham
(74) *Attorney, Agent, or Firm* — Peng Zhu; Abdollah Katbab

(57) ABSTRACT

The disclosure is directed to an access terminal, and method for selecting an access point for handing off the access terminal. The access terminal may include a processor. The processor may be configured to access a list access points and select one of the access points on the list based on the current traffic state of the access terminal.

84 Claims, 5 Drawing Sheets

U.S. PATENT DOCUMENTS

2007/0060126 A1* 3/2007 Taniguchi et al. ............ 455/436

FOREIGN PATENT DOCUMENTS

| | | | |
|---|---|---|---|
| JP | 2001313672 A | | 11/2001 |
| JP | 2004242021 A | | 8/2004 |
| JP | 2004328153 A | | 11/2004 |
| JP | 02004328274 | * | 11/2004 |
| JP | 2006014320 A | | 1/2006 |
| JP | 2006020089 A | | 1/2006 |
| JP | 2006041961 A | | 2/2006 |
| WO | WO 2005/039202 | | 4/2005 |
| WO | WO2005034562 A1 | | 4/2005 |
| WO | WO2005094111 A1 | | 10/2005 |
| WO | WO2006031671 A2 | | 3/2006 |

OTHER PUBLICATIONS

International Search Report dated Oct. 17, 2007 for PCT/US2007/067089.
Written Opinion—PCT/US2007/067089, International Search Authority, European Patent Office, Sep. 17, 2007.
Taiwan Search Report—TW096114065-TIPO—Jul. 6, 2011.

* cited by examiner

WIRELESS HANDOFFS BETWEEN MULTIPLE NETWORKS

CROSS REFERENCE TO RELATED APPLICATIONS

This application claims the benefit of priority to U.S. Provisional Patent Application No. 60/794,042, filed on Apr. 20, 2006, entitled "System Selection and Handoff Design for WLAN 3G Interworking," which is assigned to the assignee hereof, and the disclosure of which is hereby incorporated by reference in its entirety.

BACKGROUND

1. Field

The present disclosure relates generally to telecommunications, and more particularly, to systems and methods to support the handoff of an access terminal from one network to another in a wireless communications system.

2. Background

Wireless access terminals can include multiple communication protocols. Recently, access terminals have become multifunctional devices, frequently providing email, Internet access, as well as traditional cellular communications. Access terminals can be equipped with wide area wireless connectivity utilizing different technologies, such as third generation wireless or cellular systems (3G), Institute for Electrical and Electronic Engineers (IEEE) 802.16 (WiMax), and other to-be-defined Wireless Wide Area Network (WWAN) technologies. Meanwhile, IEEE 802.11 based Wireless Local Area Network (WLAN) connectivity is being installed in access terminals as well. On the horizon, ultra-wideband (UWB) and/or Bluetooth-based Wireless Personal Area Network (WPAN) local connectivity may also be available in access terminals Other examples of multiple communication protocols in an access terminal include a laptop computer that may include a WPAN to connect the laptop to a wireless mouse, a wireless keyboard, and the like. In addition, the laptop computer may include an IEEE 802.11b or 802.11g device to allow the laptop computer to communicate with a WLAN. WLAN has become popular and, for example, is being set up in homes for both personal and business purposes. In addition, coffee shops, Internet cafes, libraries and public and private organizations utilize WLANs.

WWAN technologies are distinguished by wide area (ubiquitous) coverage and wide area deployment. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

The number of networks and protocols continues to increase rapidly due to demands for functionality associated with unique user demands and divergent protocols. Such disparate networks and protocols are laborious for a user to switch between and in many cases, the user is trapped in a network without regard to what might be the optimal network for the user at a given time. In view of the foregoing, there is a need to provide for seamless transition between networks and/or protocols for optimizing and converging on the best communication protocol for the user.

SUMMARY

An aspect of an access terminal is disclosed. The access terminal includes a processor configured to access a list access points and select one of the access points on the list based on the current traffic state of the access terminal.

An aspect of a method of communications on an access terminal is disclosed. The method includes accessing a list access points, and selecting one of the access points on the list based on the current traffic state of the access terminal.

Another aspect of an access terminal is disclosed. The access terminal includes means for accessing a list access points, and means for selecting one of the access points on the list based on the current traffic state of the access terminal.

An aspect of a computer-readable medium including instructions stored thereon is disclosed. The computer-readable medium includes a first instruction set for accessing a list access points, and a second instruction set for selecting one of the access points on the list based on the current traffic state of the access terminal.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following detailed description, various techniques will be described in connection with a handoff of an access terminal from one network to another. A number of these techniques will be described in the context of an access terminal traveling through WWAN with one or more wireless WLANs dispersed throughout the coverage region. While these techniques may be well suited for this application, those skilled in the art will readily appreciate that these techniques can be extended to other access terminals capable of utilizing different protocols to communicate with different networks. By way of example, these techniques may be applied to an access terminal capable of switching between a CDMA2000 1x network and a GSM network and a UMTS network. Accordingly, any reference to an access terminal capable of communicating with one or more WLANs as it moves throughout a WWAN is intended only to illustrate various aspects of the invention, with the understanding that these aspects have a wide range of applications.

Figure 1:
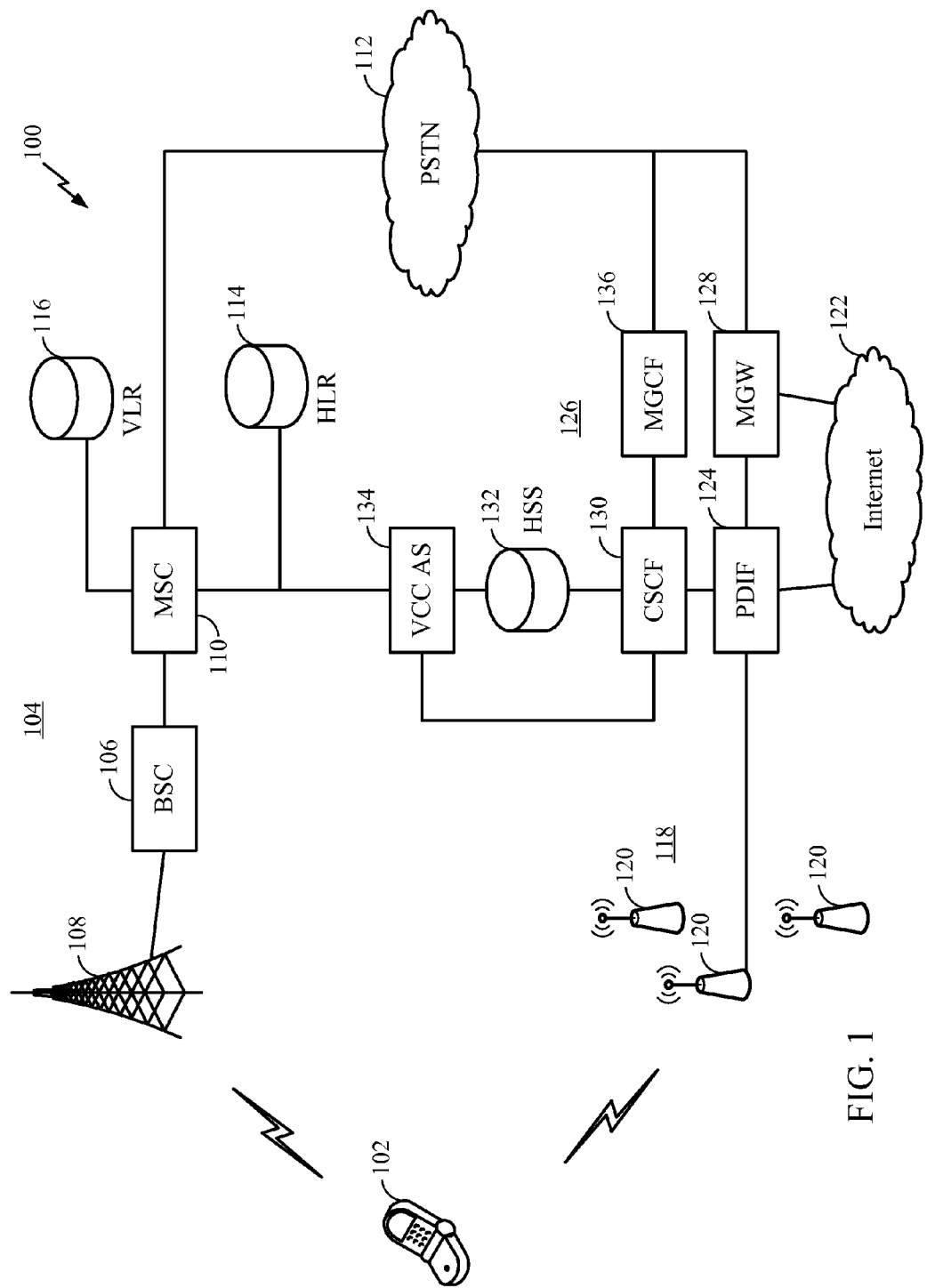
FIG. 1 is a conceptual block diagram illustrating an example of a communications system featuring more than one radio access technology.

FIG. 1 is a conceptual block diagram of an embodiment of a wireless communications system 100. An access terminal 102 is communication with a WWAN 104. The access terminal 102 may be a wireless telephone, a laptop computer, a personal digital assistant (PDA), a data transceiver, a pager, a camera, a game console, a modem, or any other suitable wireless communications device. The access terminal 102 may be referred to by those skilled in the art by other names such as a handset, user terminal, user equipment, mobile station, mobile unit, subscriber station, subscriber unit, mobile radio, radio telephone, wireless station, wireless device, wireless communications device, or some other terminology. The various concepts described throughout this disclosure are intended to apply all wireless communication devices regardless of their specific nomenclature.

The WWAN 104 includes a Base Station Controller (BSC) 106 supporting a number of base station transceivers, or access points, dispersed throughout the WWAN 104. A single access point 108 is shown in FIG. 1 for simplicity of explanation. A Mobile Switching Center (MSC) 110 may be used to provide an interface to a Public Switched Telephone Network (PSTN) 112, or other circuit-switched network. Although not shown in FIG. 1, the WWAN 104 may employ numerous BSCs each supporting any number of access points to extend the geographic reach of the WWAN 104. When multiple BSCs are employed, the MSC 110 may also be used to coordinate communications between the BSCs.

A Home Location Register (HLR) 114 is shown coupled to the MSC 110, but alternatively may be co-located or integrated with the MSC 110. The HLR 114 is a entity that manages access terminals by maintaining a record of subscribers to a service provider. It maintains such information as the subscriber's phone number, authentication data, allowed services, billing information, etc. The HLR 114 is also used to provide subscriber information to foreign networks serving the access terminal 102. By way of example, when the access terminal 102 roams outside its home network, subscriber information located in the HLR 114 may be sent to a Visitor Location Register VLR (not shown) associated with the MSC currently serving the access terminal. The MSC 110 shown in FIG. 1 also maintains its own VLR 116 to support roaming access terminals from other networks.

One or more WLANs may be dispersed throughout the geographic coverage region of the WWAN 104. A single WLAN 118 is shown in FIG. 1 for simplicity of explanation. The WLAN 118 may be an IEEE 802.11 network, or any other suitable network. The WLAN 118 includes a number of access points 120 that connect the access terminal 102 to the Internet 122, or other packet-based network, through a Packet Data Interworking Function (PDIF) 124.

In the communications system 100 shown in FIG. 1, the access terminal 102 is capable of communicating over the WWAN 104 using 3G wireless technology. As the access terminal 102 moves into the coverage region of the WLAN 118, it may be handed off to an access point 120 and communicate over the Internet using Voice over Internet Protocol (VoIP). An IP Multimedia Subsystem (IMS) 126 may be used by the access terminal 102 to provide multimedia and voice services controlled by a Session Initiation Protocol (SIP). SIP is a signaling protocol used over IP networks for VoIP.

The IMS 126 includes a Media Gateway (MGW) 128. The MGW 128 terminates the encoded voice stream from the PSTN 112 and the voice packets from the Internet 122. A Call Session Control function (CSCF) 130 communicates with a Home Subscriber Server (HSS) 132. Much like the HLR 114 in the WWAN 104, the HSS 132 maintains subscriber information. The CSCF 130 also determines the routing to the access terminal 102 for mobile terminated calls and supports signaling with the access terminal 102 for call setup and supplemental services through SIP. A Media Gateway Control Function (MGCF) 136 communicates with CSCF 130 through SIP to control the MGW 128. The MGCF 136 also provides Signaling System No. 7 (SS7) protocol for call setup over the PSTN 112.

In the communications system 100 shown in FIG. 1, the access terminal 102 may use the WWAN 104 to access the PSTN 112 in a conventional fashion. Once the access terminal 102 is connected to the WWAN 104, it may choose to either utilize the circuit switched (CS) services offered by the traditional CS network or utilize the services of the IMS 126 through a registration procedure or both. The CS registration procedure involves the access terminal 102 as well as elements in CS core such as serving MSC 110, VLR 116, and HLR 114. The CS registration information can be conveyed to the VCC AS 134 using protocols such as Wireless Intelligent Network (WIN) or Customized Applications for Mobile Enhanced Logic (CAMEL). The IMS registration procedure begins with the access terminal 102 sending a SIP registration request to the packet switched (PS) core functions such as the PDIF 124, PDSN (not shown), or SGSN-GGSN (not shown). The request is forwarded by the PS core to the CSCF 130. The CSCF 130 forwards the registration to the Voice Call Continuity Application Server (VCC AS) 134. The VCC AS 134 provides an interface between CS core network and IMS core network. The CSCF 130 also communicates with the HSS 132 to obtain the user's profile and complete the registration procedure.

When a user on the access terminal 102 makes a call over the WLAN 118 to the PSTN 112, SIP signaling is exchanged between the access terminal 102 and the CSCF 130. In response, the CSCF 130 selects a MGCF 136 and signals the MGCF 136 using SIP. The MGCF 136 instructs the MGW 128 to allocate the necessary resources to support the call. The MGCF 136 also delivers the SS7 setup messages to the called party through the PSTN 112. Once the call is set up, the MGW 128 performs any necessary transcoding between the media formats used on the Internet 122 and those used on the PSTN 112. In the event that the access terminal 102 is handed off to the WWAN 104 during the call, the necessary signaling information related to the call is anchored in the VCC AS 134 where as the bearer path is anchored in the MGW 128.

Figure 2:
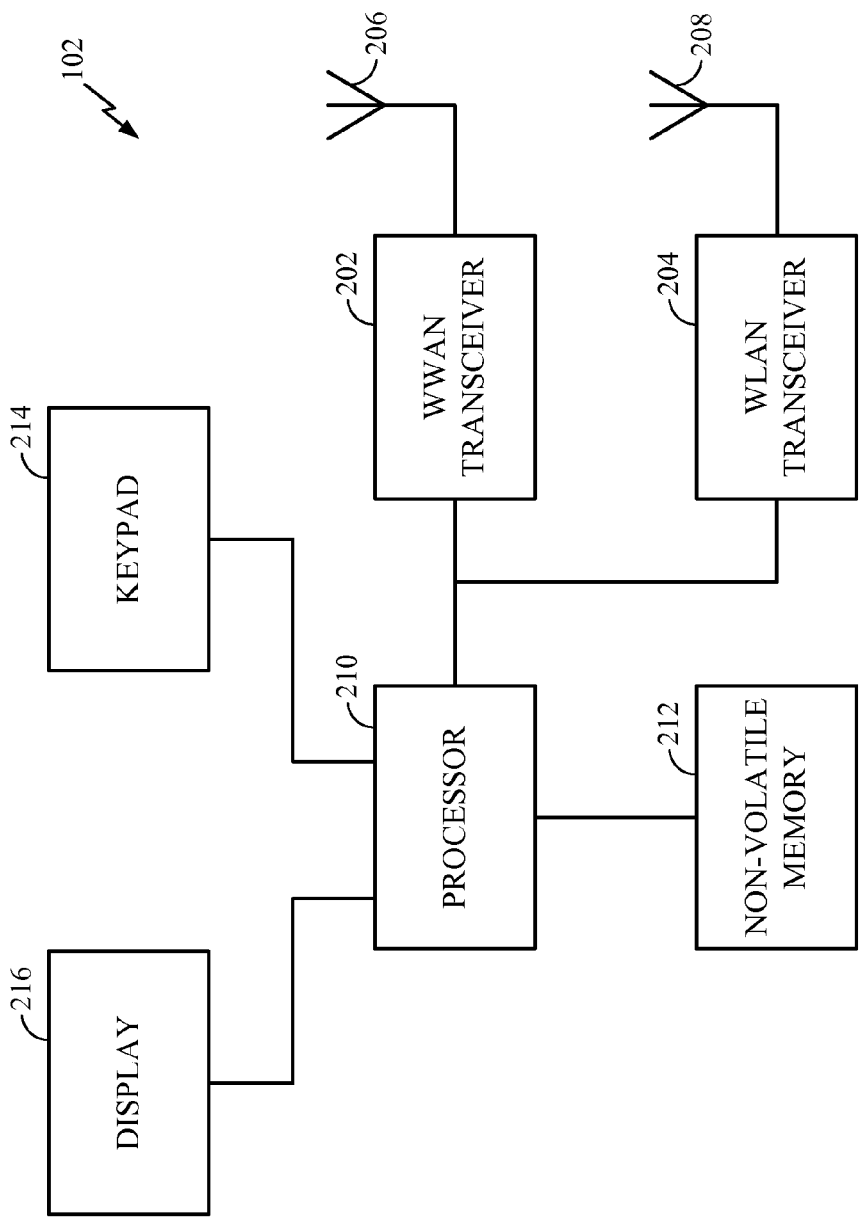
FIG. 2 is a block diagram illustrating an example of an access terminal.

FIG. 2 is a simplified block diagram illustrating an example of an access terminal 102 capable of supporting both WWAN and WLAN communications. The access terminal 102 may include a WWAN transceiver 202 and WLAN transceiver 204. In at least one embodiment of the access terminal 102, the WWAN transceiver 202 is capable of supporting cellular or 3G wireless communications with an access point (not shown) employing Code-Division Multiple Access (CDMA), Wideband Code-Division Multiple Access (WCDMA), Orthogonal Frequency Division Multiple Access (OFDMA), or any other suitable multiple access scheme. The WLAN transceiver 204 may be capable of supporting communications with an access point (not shown) using IEEE 802.11, UWB, Bluetooth and/or other related technologies. The access terminal 102 may employ two transceivers 202, 204 as shown in FIG. 2, or alternatively, a single transceiver capable of supporting multiple protocols. The transceivers 202, 204 are shown with separate antennas 206, 208, respectively, but the transceivers 202, 204 could share a single broadband antenna and a fraction of the RF-chain. Those skilled in the art are readily capable of designing the optimal transceiver for any particular application.

The access terminal 102 is also shown with a processor 210 coupled to both transceivers 202, 204, however, a separate processor may be used for each transceiver in alternative embodiments of the access terminal 102. The processor 210 may be implemented with one or more general purpose and/or specific application processors. Software programs residing in non-volatile memory 212 may be used by the general purpose processor(s) to control and manage access to the WWAN and WLAN, as well as provide other communication and processing functions. The processor 210 may also support various user interface devices, such as a keypad 214 and display 216. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

In at least one embodiment of the access terminal 102, the processor 210 may be configured to maintain certain databases in the non-volatile memory 212, or elsewhere, to provide for seamless transition between the WWAN and the WLAN. By way of example, the processor 210 may create and maintain a database with a list of access points that have previously provided service to the access terminal 102. This database, referred to as a "Visited AP List," may include historical information relating to the quality of service provided by each access point in the past.

It is also possible that this database is stored in network and both the access terminal 102 and the network coordinate to manage this database. Such coordination may include a procedure for the network to populate the database initially or update the database based on the knowledge of the access point entries added by the access terminal. Also, the network can use the information reported by the access terminal to learn and update its knowledge of the topology of available access points that potentially belong to another access network.

When the processor 210 initially attempts to associate with an access point for the first time, the access point may be placed on the Visited AP List. The processor 210 associates with the access point by setting up a wireless connection. Once a wireless connection is established, the processor 210 then attempts to establish a network connection to the Internet and complete SIP registration to support VoIP. The success, or failure, of the processor 210 to establish a wireless and network connection, and complete SIP registration, may be recorded in the Visited AP List. The processor 210 may also record in the Visited AP List a number of quality metrics relating to the various traffic states of the access terminal 102.

The processor 210 may add access points to the Visited AP List by their MAC ID (unique identifier of the access point). For each access point entry, the processor 210 may include any information that may be useful to assist it in a handoff between the WWAN and the WLAN, or an inter-access point handoff within the WLAN 118. This information may be updated by the processor 210 every time it associates with an access point. Examples of access point entries include a MAC ID, a SSID (system name), a MDID (MAC address of authenticating entity), a Domain ID (common gateway for inter-access point voice call handoff), a Network Domain (IP address of the DNS server or IP address of DHCP server and related DHCP parameters), a time stamp, an indication as to whether the last attempt by the access terminal to associate with the access point was successful, the number of failed attempts to associate with the access point, a weighted ratio of successful associations with the access point with the most recent successes given more weight, an indication as to whether the last attempt to establish a network connection through the access point was successful (successful assignment of an IP address from a DHCP server), the number of failed attempts to establish a network connection through the access point, a weighted ratio of successful network connections through the access point with recent successes given more weight, an indication as to whether the last SIP registration was successful, the number of failed SIP registration attempts, the VoIP setup latency through the access point, the quality of the voice call in terms of jitter, delay, lost frames and dropped calls, an indication as to whether quality of service (QoS) is enabled, an indication of the maximum listen interval supported by the access point, Delivery Traffic Indication Message (DTIM) interval supported by the access point (interval between broadcast/multicast messages), and a WWAN fingerprint (set of access point pilot signals visible to the access terminal while associated with the access point). Those skilled in the art will be readily able to determine the appropriate information to include in the Visited AP List depending upon the particular application.

When the access terminal 102 performs the inter AP handoff, the access terminal 102 performs 802.11 authentication and association. Additionally, when required by the access network, the terminal may perform 802.11i/802.1X or WPA authentication. However, when the access network supports pre-authentication, complete 802.1X authentication may not be required and thus the handoff latency may be reduced. The access terminal 102 can store this information regarding which access points do and do not belong to the same authentication domain in the Visited AP list to determine the suitable candidate for handoff. After the access authentication, the access terminal 102 uses DHCP to acquire IP address. When there is change in IP address after the inter-AP handoff, the access terminal 102 needs to either reestablish or update the VPN with PDIF using IKEv2 or MOBIKE procedure. This VPN establishment procedure further introduces delay in handoff procedure. Such delay may not be tolerable for real time applications such as VoIP, video telephony, etc. However, not all inter-AP handoff may result in change in IP address assigned to the access terminal. In particular when the access points reside on the same subnet are served by the same DHCP server, the access terminal will be able to hold on to its IP address. When there is no change in the IP address of the access terminal, the access terminal does not have to perform time-consuming procedure of either VPN establishment or VPN update. The access terminal will thus record the information whether the handoff between a pair of access points results in change of IP address or not. Moreover, the access terminal will group all the access points that retain the IP address assignment together. Such groups can be optionally identified by arbitrary group identifier or other unique attributes such as IP address of the DHCP server to simplify implementation.

The processor 210 may also be configured to maintain one or more provisioned databases in the non-volatile memory 212. By way of example, access terminal 102 may be provisioned with information that allows the processor to quickly associate with a preferred access point, or seamlessly handoff a call from the WWAN to a preferred access point. Similar to the Preferred Roaming List (PRL) commonly employed in cellular phones, the access terminal 102 may store a list of preferred access points, along with the MAC addresses, channel, and security credentials for each. A typical application may include a company that issues access terminals to its employees with company access points provisioned in the access terminal. Another application may include a user with a WLAN in his home. In this application, the user may manually provision in the access terminal the access points located in his home.

The processor 210 may also be configured to maintain a database containing a list of access points that should be avoided. This list may include, by way of example, rogue access points. A rogue access point is an access point that is placed in the vicinity of an access network by a malicious individual in an attempt to disturb the service offered by the access network provider. Typically, these rogue access points will not provide WAN connectivity. The list may also include access points that have repeatedly failed to provide acceptable service in the past. An access point on the list may be unable to provide acceptable service because of disturbances in the wireless channel, poor network connectivity, the inability to quickly handoff the access terminal to another access point, or for any other reason that would result in low quality service. Some access points may use local policies such as MAC address filtering or IP address filtering to prevent some access terminals from using them, in which case those access points may be listed. The list may also include access points where the access terminal failed to get an IP address. The list may also include access points where the access terminal failed to authenticate and set up a secure link even though the appropriate credentials were available. Some access points in the list may feature a poor implementation that makes them unsuitable for a given type of service (VoIP).

The processor 210 may maintain a database in volatile memory (not shown), or elsewhere, containing a list of candidate access points for handing off the access terminal 102. This list is referred to as a "Candidate AP List." During operation, the processor 210 periodically scans the WLAN for access points using a passive or active scan. The processor 210 adds each access point discovered during the scan to the Candidate AP List. Accompanying each access point entry is a MAC ID, a SSID, a MDID, a Domain ID, a Network Domain, and a time stamp. The processor 210 may also include the number of active or passive scans in which the access point was missed (i.e., missing probe response or beacons). The access point may be deleted from the Candidate AP List if there are too many missed scans or missed beacons.

The information from the Visited AP List may be used to control certain quality variables for each access point in the Candidate AP List. More specifically, the information in the Visited AP List may be used to control an "association variable" that indicates the likelihood of success that the access terminal will be able to associate with the access point. The information in the Visited AP List may also be used to control a "network variable" and a "SIP registration variable" that respectively indicate the likelihood of success that the access terminal will be able to establish a network connection and complete SIP registration through the access point.

Each access point in the Candidate AP List may also include a handoff flag for each traffic state. The handoff flag may be enabled or disabled based on the quality variables and the information in the Visited AP List. By way of example, the Candidate AP List may include a idle handoff flag for each access point. The idle handoff flag may be enabled if the association, network and SIP registration variables are above certain thresholds. These thresholds may be set conservatively (i.e., low) because idle handoffs may be attempted even if the likelihood of success is low.

A data session handoff flag may also be included for each access point on the Candidate AP List. More aggressive thresholds (i.e., higher) may be required to enable the data session handoff flag for the association and network variables. However, a data session handoff may be attempted even if the likelihood of successfully completing SIP registration is low. Therefore, the threshold for the SIP registration variable can remain conservative.

The Candidate AP List may also include a voice call handoff flag for each access point. Enablement of the voice call handoff flags may require aggressive thresholds for the association, network and SIP registration variables. In addition, historical information from the Visited AP List relating to the voice call quality and VoIP setup latency should also be considered when determining whether to enable the voice call handoff flag. Various metrics may be used to determine the voice quality of each call through an access point including, by way of example, delay, jitter, frame loss and dropped calls. The handoff of a voice call to an access point should be attempted only when the access point has demonstrated a history of providing acceptable voice quality.

An inter-access point voice call handoff flag may also be included for each access point. Enablement of the inter-access voice call handoff flag should require aggressive thresholds for the association, network, and SIP registration variable, good voice quality and low VoIP setup latency. In addition, a handoff should be attempted only where the voice call can be continued using the same IP address. The Domain ID in the Candidate AP List may be consulted to ensure this condition is met before enabling this flag.

The candidate AP list may also include an indication as to whether QoS is enabled, the received signal strength indicator (RSSI) of the probe response or beacon of the access point the duration with RSSI above a given threshold, the beacon interval of the access point, the time synchronization function (TSF) offset, and any other information that might be useful to the processor 210 for providing seamless transitions to access points.

The processor 210 may also maintain a database in volatile memory (not shown), or elsewhere, a "WWAN Candidate List." The WWAN Candidate List is created by the processor 210 from periodic scans for access points in the WWAN. The list may also be refreshed by observing the RSSI of any frame received from that access point. The WWAN Candidate List includes a predetermined number of candidate access points having the strongest pilot signals.

Various handoff procedures may be implemented by the processor 210. In at least one embodiment, the processor 210 may perform a reactive or proactive handoff from the WWAN to the WLAN. A reactive handoff occurs when the processor 210 determines that a serving access point in the WWAN has poor signal quality or is providing poor data service, which might be the case if the access terminal is moving away from the serving access point. If this occurs, the processor 210 selects the access point with the strongest RSSI in the Candidate AP List with an enabled handoff flag indicating that the access point can support the current traffic state of the access terminal 102 (i.e., idle, data session, voice call).

A proactive handoff involves the handoff of the access terminal 102 to the WLAN access point having the highest RSSI in the Candidate AP List with an enabled handoff flag for the current traffic state of the access terminal 102, provided the RSSI is above a threshold for a sustained period of time. If multiple access points in the WLAN have comparable RSSIs and the appropriate handoff flag enabled, the processor 210 may handoff the access terminal 102 to an access point with QoS enabled and a lesser load. In the idle state, the processor 210 may also initiate a proactive handoff if camping on the WLAN is the preferred mode of operation.

A proactive handoff may also be user initiated. A user on an access terminal 102 served by the WWAN may initiate a handoff to a WLAN access point by making a keypad entry.

This might occur, for example, when a user enters his home or a hotspot equipped with a WLAN.

When the access terminal 102 is associated with an access point in the WLAN, the processor 210 may perform an inter-access point handoff, or handoff the access terminal 102 to the WWAN. In at least one embodiment of the processor 210, the processor 210 may perform a reactive or proactive inter-access point handoff, but only a reactive handoff to an access point in the WWAN.

A proactive inter-access point handoff may be performed in each traffic state. During a voice call, for example, the processor 210 may periodically search for an access point in the Candidate AP List that can support an inter-access point handoff for a voice call (i.e., an enabled inter-access point voice call handoff flag) and has a RSSI that (1) exceeds the RSSI of the serving access point by some threshold, and (2) has enough resources left to support an additional voice call. If the processor 210 is able to locate an access point in the Candidate AP List that satisfies this criteria, it hands off the access terminal 102 to that access point. If the processor 210 finds multiple access points in the Candidate AP List that satisfy this criteria, the processor 210 then selects an access point with QoS enabled for handoff of the access terminal 102.

During a data session, or when the access terminal 102 is idle, a proactive inter-access point handoff may be performed by the processor 210 by periodically searching the Candidate AP List for an access point that can support the current traffic state (i.e., an enabled idle or data session handoff flag), and has a RSSI that (1) exceeds the RSSI of the serving access point by some threshold, and (2) is sufficient to support the current traffic state. If the processor 210 is able to locate an access point in the Candidate AP List that satisfies this criteria, it hands off the access terminal 102 to this access point. If the processor 210 find multiple access points in the Candidate AP List that satisfy this criteria, the processor 210 then selects an access point with QoS enable for handoff of the access terminal 102.

A reactive handoff may result in an inter-access point handoff, or a handoff of the access terminal 102 to the WWAN. During a voice call, if the RSSI of the serving access point falls below a threshold, the processor 210 handoffs the access terminal 102 to the WWAN if it can find an access point in the WWAN Candidate List with a pilot signal strength that exceeds a certain threshold. If the processor 210 is unable to find a suitable access point in the WWAN, then it will attempt an inter-access point handoff to a WLAN access point in the Candidate AP List that can support an inter-access point handoff of a voice call (i.e., an enabled inter-access point voice call handoff flag) and has a RSSI sufficient to support a voice call with acceptable quality. Again, if the processor 210 finds multiple access points that satisfy this criteria, the processor 210 then selects an access point with QoS enabled for handoff of the access terminal 102.

During a data session, or when the access terminal 102 is idle, a reactive handoff may be initiated by the processor 210 if the RSSI of the serving access point falls below a certain threshold. If this condition exists, the processor 210 then initiates a handoff to the WWAN if it can find an access point in the WWAN Candidate List with a pilot signal strength that exceeds a certain threshold. If the processor 210 is unable to find a suitable access point in the WWAN, then it will attempt an inter-access point handoff to the access point in the Candidate AP List with the highest RSSI that can support the current traffic state (i.e., an enabled idle or data session handoff flag). Again, if the processor 210 finds multiple access points that satisfy this criteria, the processor 210 then selects an access point with QoS enable for handoff of the access terminal 102.

In at least one embodiment of the access terminal, the user can initiate a handoff between the WWAN and WLAN or an inter-access point handoff in each traffic state. In each case, the available access points in the Candidate AP List or WWAN Candidate List can be presented to the user on the display 216 of the access terminal. The user can then make one or more entries on the keypad 214 to select an access point for handoff.

Figure 3:
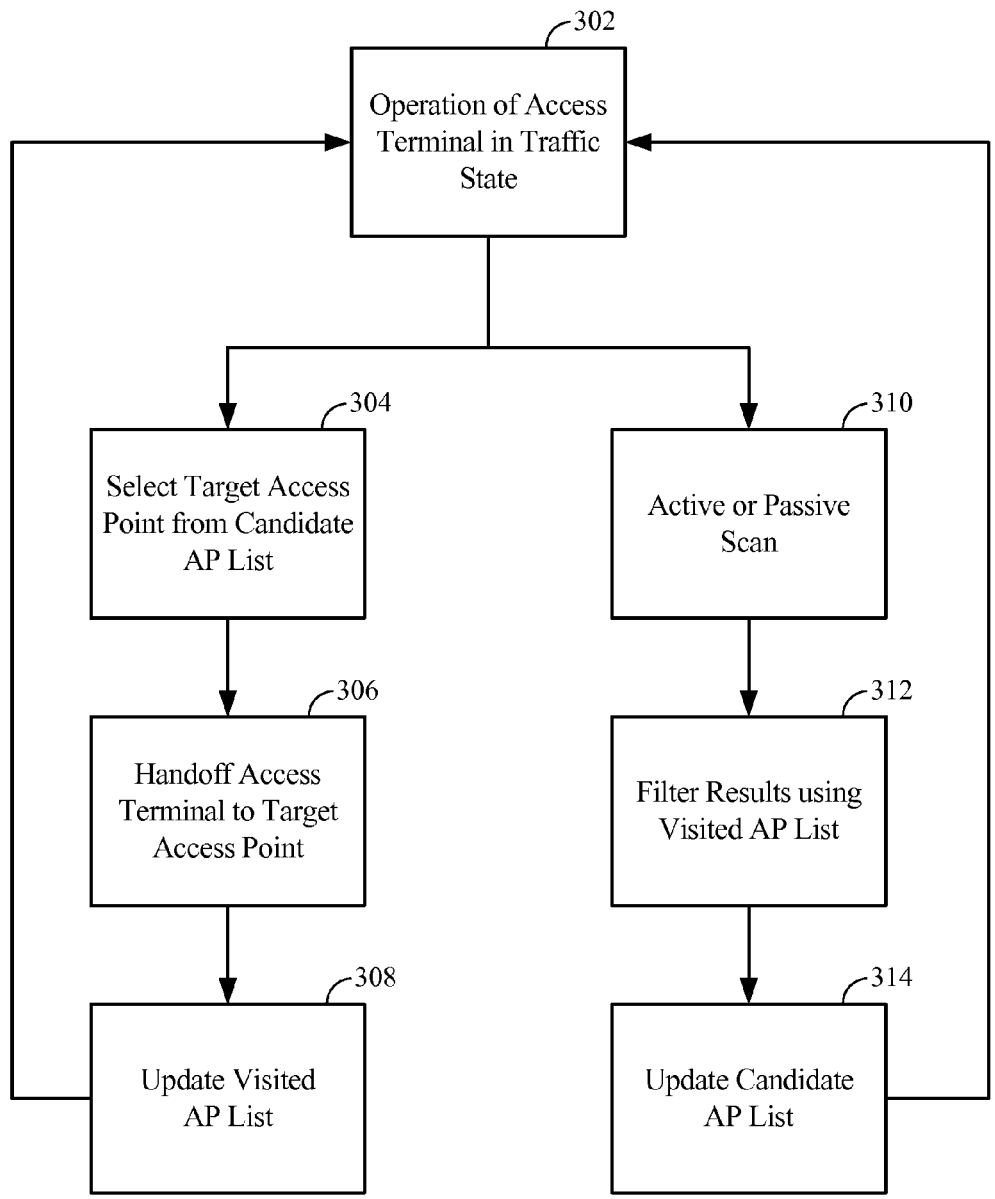
FIG. 3 is a flow chart illustrating an example of a handoff of an access terminal to an access point.

FIG. 3 is a simplified flow diagram illustrating the handoff of the access terminal to an access point in the WLAN. The handoff may be an inter-access point handoff, or alternatively, a handoff from an access point in the WWAN. Referring to FIG. 3, the access terminal is operating in one of several traffic states (i.e., voice call, data session, idle mode) in step 302. In step 304, the processor in the access terminal searches through the Candidate AP List for a target access point. The search for a target access point may be in support of a reactive or proactive handoff and the criteria used to select the target access point may be based on the current traffic state of the access terminal. Once the processor selects a target access point, it attempts to hand off the access terminal to the target in step 306. The success, or failure, of the handoff is recorded by the processor in the Visited AP List in step 308. Assuming that the processor successfully hands off of the access terminal, the processor also records in the Visited AP List various quality metrics for the target access point based on the current traffic state of the access terminal. Once the Visited AP List is updated, the access terminal continues to operate through the target access point in its current traffic state in step 302.

In step 310, the processor performs an active or passive scan for access points. The scan may be periodic or triggered. The periodic scan interval may vary depending on the current traffic state of the access terminal and the contents of the Candidate AP List. The results of the scan are filtered by the Visited AP List in step 312. More specifically, the association, network, and SIP registration variables may be computed by the processor from the Visited AP List for each access point discovered during the scan. The variables, along with other quality metrics recorded in the Visited AP List, may be used to set the traffic state handoff flags for each access point. In step 314, the access points are added to the Candidate AP List. The variables, flags, and other information computed from the Visited AP List, may also be added to the Candidate AP List for each access point entry. Once the Candidate AP List is updated, the access terminal continues to operate in its current traffic state in step 302.

Figure 4:
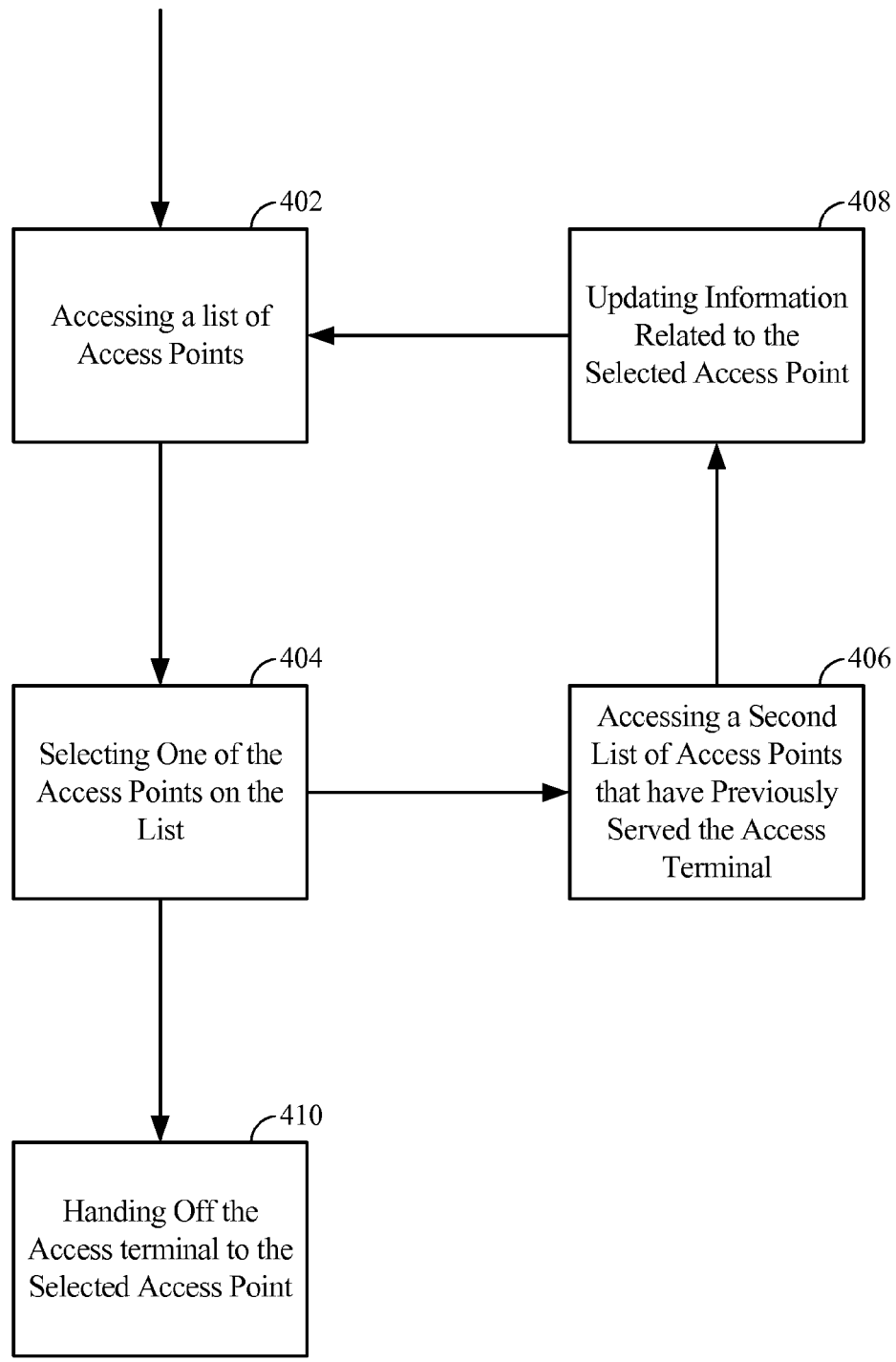
FIG. 4 is a flow chart illustrating another example of a handoff of an access terminal to an access point.

FIG. 4 is a flow chart illustrating another example of a process for selecting an access point. In step 402, the access terminal accesses a list access points. The list may be maintained in a database in the access terminal or elsewhere. In step 404, the access terminal selects one of the access points on the list based on the current traffic state of the access terminal. The selection of the access point may include a periodic scan having an interval that depends on the current traffic state of the access terminal.

In step 406, the access terminal accesses a second list containing information regarding access points that have previously served the access terminal. In step 408, the access terminal updates the information related to the selected one of the access points. The updated information may relate to whether the access terminal is able to associate with the selected one of the access points, the quality of service provided by the selected one of the access points, or other information. The quality of service may include delay, jitter, packet loss rate, time taken to associate with the selected one of the access points, dropped frames, or other quality indicators.

In one configuration of the access terminal, the selection of the access point in step 404 may be based on indicators derived from information in a second list regarding access points that have previously served the access terminal. The indicators may indicate whether each access point is a handoff candidate for each traffic state. The information from which the indicators are derived may relate to the quality of service provided to the access terminal by access points that have previously served the access terminal, access points that belong to the same subnet served by the same dynamic host configuration protocol (DHCP), access points that belong to the same authentication domain, etc.

The selection of the access point may also be based on real time measurements of the access points. The real time measurements include received power from the access points, loading on the access points, and interference on the channel of each of the access points.

The selection of the access point may also be based on a second list of access points that the access terminal is prohibited from associating with.

The selection of the access point may further be based on a list of preferred access points.

In step 410, the access terminal is handed off to the selected access point. The handoff of the access point may be between two access points in the same network or different networks. The access terminal will search for access points in the WLAN before searching for access points in the cellular network when the access terminal is in a data session. The access terminal will search for access points in the cellular network before searching for access points in the WLAN when the access terminal is in a voice call.

Figure 5:
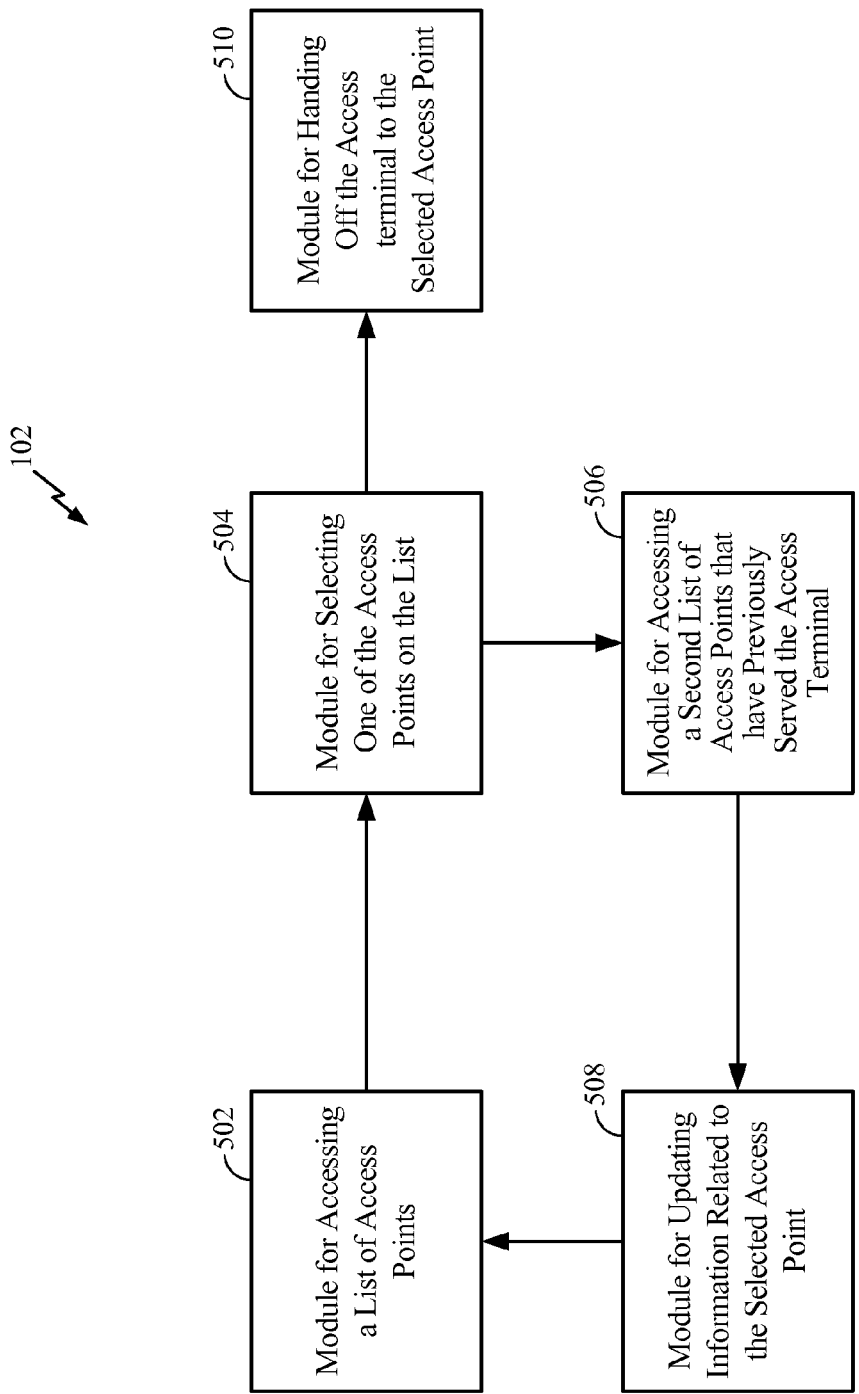
FIG. 5 is a functional block diagram illustrating another example of an access terminal.

FIG. 5 is a functional block diagram of an access terminal. The access terminal 102 includes a module 502 for accessing a list access points. The list may be maintained in a database in the access terminal or elsewhere. The access terminal 102 also includes a module 504 for selecting one of the access points on the list based on the current traffic state of the access terminal. The selection of the access point may include a periodic scan having an interval that depends on the current traffic state of the access terminal.

The access terminal 102 includes a module 506 for accessing a second list containing information regarding access points that have previously served the access terminal. The access terminal 102 also includes a module 508 for updating the information related to the selected one of the access points. The updated information may relate to whether the access terminal is able to associate with the selected one of the access points, the quality of service provided by the selected one of the access points, or other information. The quality of service may include delay, jitter, packet loss rate, time taken to associate with the selected one of the access points, dropped frames, or other quality indicators.

In one configuration of the access terminal 102, the module 504 may select an access point based on indicators derived from information in a second list regarding access points that have previously served the access terminal. The indicators may indicate whether each access point is a handoff candidate for each traffic state. The information from which the indicators are derived may relate to the quality of service provided to the access terminal by access points that have previously served the access terminal, access points that belong to the same subnet served by the same dynamic host configuration protocol (DHCP), access points that belong to the same authentication domain, etc.

The selection of the access point by the module 504 may also be based on real time measurements of the access points. The real time measurements include received power from the access points, loading on the access points, and interference on the channel of each of the access points.

The selection of the access point by the module 504 may also be based on a second list of access points that the access terminal is prohibited from associating with.

The selection of the access point by the module 504 may further be based on a list of preferred access points.

The access terminal 102 includes a module 510 for handing off to the selected access point. The handoff of the access point may be between two access points in the same network or different networks. The access terminal will search for access points in the WLAN before searching for access points in the cellular network when the access terminal is in a data session. The access terminal will search for access points in the cellular network before searching for access points in the WLAN when the access terminal is in a voice call.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access terminal, comprising:
a processor configured to access a first list of access points and select one of the access points on the first list based on a current traffic state of the access terminal, wherein the first list includes indicators for one or more of the access points on the first list that indicate whether an access point is able to support the current traffic state, wherein the processor is further configured to access a second list comprising additional information regarding at least one of the access points on the first list, wherein the access points in the second list have previously served the access terminal, the processor being further configured to update the first list based on the additional information in the second list.

2. The access terminal of claim 1, wherein the processor is further configured to maintain a database in the access terminal, the database comprising the first list of access points.

3. The access terminal of claim 1, wherein the additional information relates to whether the access terminal is able to associate with the selected one of the access points.

4. The access terminal of claim 1, wherein the additional information relates to a quality of service provided by the selected one of the access points to the access terminal.

5. The access terminal of claim 4, wherein the quality of service includes delay, jitter, packet loss rate, or time taken to associate with the selected one of the access points.

6. The access terminal of claim 4, wherein the quality of service includes dropped frames.

7. The access terminal of claim 5, wherein the quality of service includes dropped frames between the access terminal and a far end connection.

8. The access terminal of claim 1, wherein the processor is further configured to maintain the indicators from the additional information in the second list, the selection of said one of the access points also being based on the indicators.

9. The access terminal of claim 8, wherein the indicators for each of one or more access points comprise a data session handoff flag and a voice call handoff flag, and wherein the updating the first list comprises controlling the state of the indicators based on the additional information in the second list.

10. The access terminal of claim 8, wherein the additional information in the second list includes historical information relating to a quality of service provided to the access terminal by one or more access points that have previously served the access terminal.

11. The access terminal of claim 8, wherein the additional information in the second list identifies the access points that belong to the same subnet served by the same dynamic host configuration protocol (DHCP).

12. The access terminal of claim 8, wherein the additional information in the second list identifies access points that belong to the same authentication domain.

13. The access terminal of claim 1, wherein the processor is further configured to handoff the access terminal from a serving access point in a first network to the selected one of the access points, the selected one of the access points being in a second network.

14. The access terminal of claim 1, wherein the processor is further configured to handoff the access terminal from a serving access point in a network to the selected one of the access points, the selected one of the access points being in the same network as the serving access point.

15. The access terminal of claim 1, wherein the processor is further configured to select one of the access points on the first list by performing a periodic scan having an interval that depends on the current traffic state of the access terminal.

16. The access terminal of claim 1, wherein the selection of said one of the selected access points by processor is also based on real time measurements of the access points on the first list.

17. The access terminal of claim 16, wherein the real time measurements include received power from the access points, loading on the access points, and interference on a channel of each of the access points.

18. The access terminal of claim 1, wherein the processor is further configured to access a third list of access points that the access terminal is prohibited from associating with, the selection of said one of the access points also being based on the third list.

19. The access terminal of claim 1, wherein the processor is further configured to access a list of preferred access points, the selection of said one of the access points also being based on the list of preferred access points.

20. The access terminal of claim 1, wherein the access points on the first list are from a wireless local area network (WLAN) and a cellular network, and wherein the processor is further configured to select said one of the access points by searching for access points in the WLAN before searching for access points in the cellular network when the access terminal is in a data session.

21. The access terminal of claim 1, wherein the access points on the first list are from a wireless local area network (WLAN) and a cellular network, and wherein the processor is further configured to select said one of the access points by searching for access points in the cellular network before searching for access points in the WLAN when the access terminal is in a voice call.

22. A method of communications on an access terminal, comprising:
employing a processor to execute computer readable instructions stored on a computer readable medium to perform the following acts:
accessing a first list of access points;
selecting one of the access points on the first list based on a current traffic state of the access terminal, wherein the first list includes indicators for one or more of the access points on the first list that indicate whether an access point is able to support the current traffic state;
accessing a second list comprising additional information regarding at least one of the access points on the first list, wherein the access points in the second list have previously served the access terminal; and
updating the first list based on the additional information in the second list.

23. The method of claim 22, further comprising maintaining a database in the access terminal, the database comprising the first list of access points.

24. The method of claim 22, wherein the additional information relates to whether the access terminal is able to associate with the selected one of the access points.

25. The method of claim 22, wherein the additional information relates to a quality of service provided by the selected one of the access points to the access terminal.

26. The method of claim 25, wherein the quality of service includes delay, jitter, packet loss rate, or time taken to associate with the selected one of the access points.

27. The method of claim 25, wherein the quality of service includes dropped frames.

28. The method of claim 27, wherein the quality of service includes dropped frames between the access terminal and a far end connection.

29. The method of claim 22, further comprising maintaining the indicators from the additional information in the second list, the selection of said one of the access points also being based on the indicators.

30. The method of claim 29, wherein the indicators for each of one or more access points indicates whether the access point is a handoff candidate for each traffic state, wherein the updating the first list comprises controlling the state of the indicators based on the additional information in the second list.

31. The method of claim 29, wherein the additional information in the second list includes historical information relating to a quality of service provided to the access terminal by one or more access points that have previously served the access terminal.

32. The method of claim 29, wherein the additional information in the second list identifies the access points that belong to the same subnet served by the same dynamic host configuration protocol (DHCP).

33. The method of claim 29, wherein the additional information in the second list identifies access points that belong to the same authentication domain.

34. The method of claim 22, further comprising handing off the access terminal from a serving access point in a first network to the selected one of the access points, the selected one of the access points being in a second network.

35. The method of claim 22, further comprising handing off the access terminal from a serving access point in a network to the selected one of the access points, the selected one of the access points being in the same network as the serving access point.

36. The method of claim 22, wherein the selection of said one of the access points comprising performing a periodic scan having an interval that depends on the current traffic state of the access terminal.

37. The method of claim 22, wherein the selection of said one of the selected access points is also based on real time measurements of the access points on the first list.

38. The method of claim 37, wherein the real time measurements include received power from the access points, loading on the access points, and interference on a channel of each of the access points.

39. The method of claim 22, further comprising accessing a third list of access points that the access terminal is prohibited from associating with, the selection of said one of the access points also being based on the third list.

40. The method of claim 22, further comprising accessing a list of preferred access points, the selection of said one of the access points also being based on the list of preferred access points.

41. The method of claim 22, wherein the access points on the first list are from a wireless local area network (WLAN) and a cellular network, and wherein the selection of said one of the access points comprises searching for access points in the WLAN before searching for access points in the cellular network when the access terminal is in a data session.

42. The method of claim 22, wherein the access points on the first list are from a wireless local area network (WLAN) and a cellular network, and wherein the selection of said one of the access points comprises searching for access points in the cellular network before searching for access points in the WLAN when the access terminal is in a voice call.

43. An access terminal, comprising:
means for accessing a first list of access points;
means for selecting one of the access points on the first list based on a current traffic state of the access terminal, wherein the first list includes indicators for one or more of the access points on the first list that indicate whether an access point is able to support the current traffic state;
means for accessing a second list comprising additional information regarding at least one of the access points on the first list, wherein the access points in the second list have previously served the access terminal; and
means for updating the first list based on the additional information in the second list.

44. The access terminal of claim 43, further comprising means for maintaining a database in the access terminal, the database comprising the first list of access points.

45. The access terminal of claim 43, wherein the additional information relates to whether the access terminal is able to associate with the selected one of the access points.

46. The access terminal of claim 43, wherein the additional information relates to a quality of service provided by the selected one of the access points to the access terminal.

47. The access terminal of claim 46, wherein the quality of service includes delay, jitter, packet loss rate, or time taken to associate with the selected one of the access points.

48. The access terminal of claim 46, wherein the quality of service includes dropped frames.

49. The access terminal of claim 48, wherein the quality of service includes dropped frames between the access terminal and a far end connection.

50. The access terminal of claim 43, further comprising means for maintaining the indicators from the additional information in the second list, and wherein the means for selecting one of the access points on the first list is configured to use the indicators to select said one of the access points.

51. The access terminal of claim 50, wherein the indicators for each of one or more access points indicates whether the access point is a handoff candidate for each traffic state, wherein the means for updating the first list comprise means for controlling the state of the indicators based on the additional information in the second list.

52. The access terminal of claim 50, wherein the additional information in the second list includes historical information relating to a quality of service provided to the access terminal by one or more access points that have previously served the access terminal.

53. The access terminal of claim 50, wherein the additional information in the second list identifies the access points that belong to the same subnet served by the same dynamic host configuration protocol (DHCP).

54. The access terminal of claim 50, wherein the additional information in the second list identifies access points that belong to the same authentication domain.

55. The access terminal of claim 43, further comprising means for handing off the access terminal from a serving access point in a first network to the selected one of the access points, the selected one of the access points being in a second network.

56. The access terminal of claim 43, further comprising handing off the access terminal from a serving access point in a network to the selected one of the access points, the selected one of the access points being in the same network as the serving access point.

57. The access terminal of claim 43, wherein the means for selecting one of the access points further comprises means for performing a periodic scan having an interval that depends on the current traffic state of the access terminal.

58. The access terminal of claim 43, wherein the means for selecting one of the access points is configured to use real time measurements to select said one of the access points.

59. The access terminal of claim 58, wherein the real time measurements include received power from the access points, loading on the access points, and interference on a channel of each of the access points.

60. The access terminal of claim 43, further comprising means for accessing a third list of access points that the access terminal is prohibited from associating with, wherein the means for selecting one of the access points is configured to use the third list to select said one of the access points.

61. The access terminal of claim 43, further comprising means for accessing a list of preferred access points, wherein the means for selecting one of the access points is configured to use the list of preferred access points to select said one of the access points.

62. The access terminal of claim 43, wherein the access points on the first list are from a wireless local area network (WLAN) and a cellular network, and wherein the means for selecting one of the access points is configured to search for access points in the WLAN before searching for access points in the cellular network when the access terminal is in a data session.

63. The access terminal of claim 43, wherein the access points on the first list are from a wireless local area network (WLAN) and a cellular network, and wherein the means for selecting one of the access points is configured to search for access points in the cellular network before searching for access points in the WLAN when the access terminal is in a voice call.

64. A non-transitory computer-readable medium including instructions stored thereon, comprising:

a first instruction set for accessing a first list of access points;

a second instruction set for selecting one of the access points on the first list based on a current traffic state of the access terminal, wherein the first list includes indicators for one or more of the access points on the first list that indicate whether an access point is able to support the current traffic state;

a third instruction set for accessing a second list comprising additional information regarding at least one of the access points on the first list, wherein the access points in the second list have previously served the access terminal; and a fourth instruction set for updating the first list based on the additional information in the second list.

65. The computer-readable medium of claim 64, further comprising a fifth instruction set for maintaining a database in the access terminal, the database comprising the first list of access points.

66. The computer-readable medium of claim 64, wherein the additional information relates to whether the access terminal is able to associate with the selected one of the access points.

67. The computer-readable medium of claim 64, wherein the additional information relates to a quality of service provided by the selected one of the access points to the access terminal.

68. The computer-readable medium of claim 67, wherein the quality of service includes delay, jitter, packet loss rate, or time taken to associate with the selected one of the access points.

69. The computer-readable medium of claim 67, wherein the quality of service includes dropped frames.

70. The computer-readable medium of claim 69, wherein the quality of service includes dropped frames between the access terminal and a far end connection.

71. The computer-readable medium of claim 64, further comprising a fifth instruction set for maintaining the indicators from the additional information in the second list, and wherein the second instruction set is configured to use the indicators to select said one of the access points.

72. The computer-readable medium of claim 71, wherein the indicators for each of one or more access points indicates whether the access point is a handoff candidate for each traffic state, wherein the fourth instruction set updates the first list by controlling the state of the indicators based on the additional information in the second list.

73. The computer-readable medium of claim 71, wherein the additional information in the second list includes historical information relating to a quality of service provided to the access terminal by one or more access points that have previously served the access terminal.

74. The computer-readable medium of claim 71, wherein the additional information in the second list identifies the access points that belong to the same subnet served by the same dynamic host configuration protocol (DHCP).

75. The computer-readable medium of claim 71, wherein the additional information in the second list identifies access points that belong to the same authentication domain.

76. The computer-readable medium of claim 64, further comprising a fifth instruction set for handing off the access terminal from a serving access point in a first network to the selected one of the access points, the selected one of the access points being in a second network.

77. The computer-readable medium of claim 64, further comprising a fifth instruction set for handing off the access terminal from a serving access point in a network to the selected one of the access points, the selected one of the access points being in the same network as the serving access point.

78. The computer-readable medium of claim 64, wherein the second instruction set is configured to perform a periodic scan having an interval that depends on the current traffic state of the access terminal.

79. The computer-readable medium of claim 64, wherein the second instruction set is configured to use real time measurements to select said one of the access points.

80. The computer-readable medium of claim 79, wherein the real time measurements include received power from the access points, loading on the access points, and interference on a channel of each of the access points.

81. The computer-readable medium of claim 64, further comprising a fifth instruction set for accessing a third list of access points that the access terminal is prohibited from associating with, wherein the second instruction set is configured to use the third list to select said one of the access points.

82. The computer-readable medium of claim 64, further comprising a fifth instruction set for accessing a list of preferred access points, wherein the second instruction set is configured to use the list of preferred access points to select said one of the access points.

83. The computer-readable medium of claim 64, wherein the access points on the first list are from a wireless local area network (WLAN) and a cellular network, and wherein the second instruction set is configured to search for access points in the WLAN before searching for access points in the cellular network when the access terminal is in a data session.

84. The computer-readable medium of claim 64, wherein the access points on the first list are from a wireless local area network (WLAN) and a cellular network, and wherein the second instruction set is configured to search for access points in the cellular network before searching for access points in the WLAN when the access terminal is in a voice call.

* * * * *